3,074,994
Patented Jan. 22, 1963

3,074,994
METHOD OF PREPARING DICHLORIDES PRIMARY PHOSPHINE
Martin Grayson, Norwalk, Conn., assignor to American Cyanamid Company, New York, N.Y., a corporation of Maine
No Drawing. Filed Apr. 7, 1960, Ser. No. 20,565
4 Claims. (Cl. 260—464)

The present invention relates to a novel method of halogenating primary phosphines. More particularly, the instant discovery concerns the reaction of phosgene with primary phosphines to provide the corresponding alkyl dichlorophosphines.

In 1879 Michaelis and Dittler (Ber. 12, 338) reported that arylphosphines, namely phenylphosphine, could be reacted at elevated temperatures with phosgene gas to produce very desirable yields of the corresponding dichlorophenylphosphine.

Since then attempts to convert primary aliphatic and cycloaliphatic phosphines, substituted or unsubstituted, to their corresponding dichloro-derivatives following the Michaelis and Dittler process have not been successful. For example, repeating the Michaelis and Dittler process using cyanoethylphosphine $NCCH_2CH_2PH_2$ in lieu of phenylphosphine provides yields of dichloro-2-cyanoethylphosphine $NCCH_2CH_2PCl_2$ of only about 13 percent. The reason for such low yields is not understood.

According to the present invention, however, it has been found that primary alkylphosphines and primary cycloalkylphosphines, substituted and unsubstituted, may be reacted with liquid phosgene at temperatures in the range of 8° C. to —80° C., preferably —10° C. to —60° C., to provide product yields 400 to 500 percent greater than those provided by the process taught by Michaelis and Dittler.

According to a preferred embodiment, the alkylphosphine is added to the phosgene, the latter being dissolved in an inert organic solvent, such as chloroform; the temperature of the resulting mixture is maintained at about —40° C. to —60° C. until reaction ceases. While it is not necessary that the phosphine reactant be added to the phosgene ($COCl_2$), it is essential that at almost any given time during the reaction the phosgene reactant be present in at least stoichiometric amounts or, preferably, in at least a slight excess, relative to the phosphine reactant.

Among the many inert organic solvents contemplated herein, i.e., solvents which are inert with respect to the reactants and the reaction product under the conditions of the reaction, are ethers and various chlorinated hydrocarbons in which, generally, both the phosgene and the phosphine reactant are soluble, thus providing a homogeneous reaction mixture. Typical solvents are chloroform, trichloroethylene, tetrahydrofuran, dioxane, and the like.

A wide variety of primary phosphine reactants is contemplated herein, and the following are typical: 2-cyanoethylphosphine, octylphosphine, 3-chloropropylphosphine, 3-ethoxypropylphosphine, 2-carbethoxyethylphosphine, n-octadecylphosphine, cyclohexylphosphine, 4-chlorocyclohexylphosphine, 3-ethoxycyclohexylphosphine, 3-cyanocyclohexylphosphine, and the like.

Although atmospheric pressures are generally contemplated herein, it has been found that super-atmospheric pressures may be employed successfully. It will be noted, however, that at super-atmospheric pressures proportionately higher temperatures may be employed, providing, of course, the $COCl_2$ remains in the liquid state. Example III, infra, demonstrates this fact.

Likewise, while there appears to be no apparent advantage thereto, sub-atmospheric pressures are contemplated.

The process of the present invention may be carried out in a batch, continuous or semi-continuous method. Usually agitation of the reactants provides better intermingling and more rapid reaction rates.

The primary aliphatic phosphines contemplated herein have from 1 to 20 carbon atoms in their alkyl moieties. Insofar as substituents on the alkyl moieties are concerned, cyano, halogen, lower alkoxy, carbethoxy, and the like, are typical. This applies to cycloalkyl also.

The present invention will best be understood in the light of the following examples, in which product yields on the order of about 45 to about 70 percent by weight are realized:

Example I

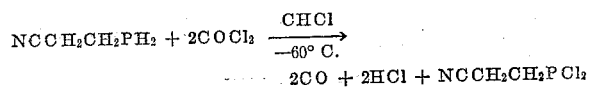

2-cyanoethylphosphine (24 grams, 0.25 mole) is added to 102 grams (1.03 mole) of phosgene condensed into 350 milliliters of chloroform at a temperature of —60° C. to —50° C. over a period of 2.5 hours. The mixture is warmed slowly (4 hours) to —20° C. and then to room temperature. After removing phosgene and solvent, the liquid product boils at 89° C. at 2.5 millimeters (Hg) pressure and weighs 22 grams.

Example II

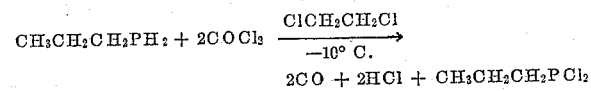

n-Propylphosphine (0.25 mole) is added to phosgene (0.55 mole) dissolved in 150 milliliters of ethylene dichloride at —10° C. over a period of one hour. The product mixture is warmed to ambient temperature, filtered to remove solid by-products, and dichloro-n-propylphosphine is recovered by distillation.

Example III

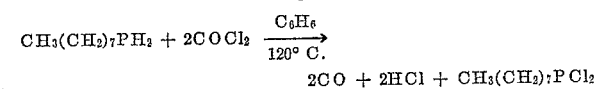

n-Octylphosphine (1.0 mole) is added to phosgene (3.0 mole) dissolved in 500 milliliters of benzene in a one-liter glass-lined autoclave at 120° C. and autogenous pressure over a period of one-half hour. The reaction mixture is agitated for an additional hour at 120° C., cooled to ambient temperature, and the product dichloro-n-octylphosphine recovered by distillation.

Example IV

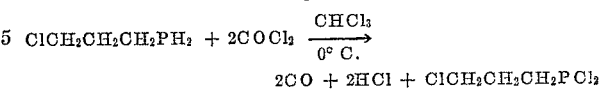

3-chloropropylphosphine dissolved in chloroform is fed simultaneously to a mixing zone at 0° C. with a solution of phosgene in chloroform at 0° C. The molar ratio of 3-chloropropylphosphine to phosgene is maintained at 1 to 2 and the product stream is fed continuously to a stripping device for removal of solvent. Crude dichloro-3-chloropropylphosphine is recovered. Subsequent distillation of this crude product gives a pure material.

Example V

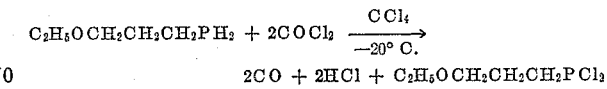

3-ethoxypropylphosphine (0.10 mole) is added to a solution of 0.60 mole of phosgene in 100 milliliters of carbon tetrachloride at −20° C. in two hours. The mixture is permitted to warm to ambient temperature in a stream of dry nitrogen, filtered, and subjected to distillation to recover dichloro-3-ethoxypropylphosphine.

*Example VI*

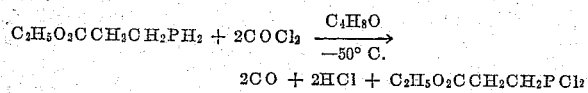

$$2CO + 2HCl + C_2H_5O_2CCH_2CH_2PCl_2$$

A solution of 2-carbethoxyethylphosphine (0.25 mole) in 50 milliliters of tetrahydrofuran is added in two hours to a solution of phosgene (1.0 mole) in 200 milliliters of tetrahydrofuran at −50° C. After warming to ambient temperature, the solution is filtered and then distilled. Dichloro-2-carbethoxyethylphosphine is thus recovered.

*Example VII*

Example III, above, is repeated in every essential respect with the exception that n-octadecylphosphine is used in lieu of n-octylphosphine and dichloro-n-octadecylphosphine recovered.

*Example VIII*

Example I, above, is repeated in every essential respect only the phosphine reactant is replaced and the corresponding product recovered:

| Reactant | Product |
| --- | --- |
| cyclohexylphosphine | dichlorocyclohexylphosphine. |
| 4-chlorocyclohexylphosphine | dichloro-4-chlorocyclohexylphosphine. |
| 3-ethoxycyclohexylphosphine | dichloro-3-ethoxycyclohexylphosphine. |
| 3-cyanocyclohexylphosphine | dichloro-3-cyanocyclohexylphosphine. |

The halogenated compounds of the present invention have direct utility as gasoline additives. For example, up to about 10 milliliters of a mixture of any one of these halogenated phosphines added to 1 gallon of gasoline affords protection against misfiring, surface ignition, and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. A method of preparing chlorinated phosphines which comprises bringing together into reactive contact a member selected from the group consisting of a primary alkylphosphine having up to 20 carbon atoms, a substituted primary alkylphosphine having up to 20 carbon atoms, a primary cyclohexylphosphine, and a substituted primary cyclohexylphosphine, and liquid phosgene at a temperature in the range of 8° C. to −80° C. and recovering the resulting corresponding dichlorophosphine selected from the group consisting of dichloroalkylphosphine, dichloro-alkylphosphine in which the alkyl moiety is substituted, dichloro-cyclohexylphosphine, and dichloro-cyclohexylphosphine in which the cycloalkyl moiety is substituted, said substituents on the alkyl and cyclohexyl reactants and products being selected from the group consisting of cyano, chloro, lower alkoxy and carbethoxy.

2. The process of claim 1 wherein the primary phosphine is added to the liquid phosgene.

3. The process of claim 1 wherein the reactants are brought together in the presence of an organic solvent inert with respect to the reactants and their corresponding reaction products under the conditions of the reaction.

4. The process of claim 1 wherein the liquid phosgene is present in at least stoichiometric amounts relative to the phosphine throughout substantially all of the reaction.

References Cited in the file of this patent

UNITED STATES PATENTS 2,437,796     Walling _____ Mar. 16, 1948

OTHER REFERENCES

Michaelis: Ber. Deut. Chem., vol. 12, pp. 338–340 (1897). (Copy of above in Patent Office Library.)